United States Patent Office 3,312,755
Patented Apr. 4, 1967

3,312,755
READILY DYEABLE COMPOSITIONS CONSISTING OF ISOTACTIC POLYPROPYLENE AND FROM 0.1 TO 20% OF A MEMBER SELECTED FROM THE GROUP CONSISTING OF POLYAMIDES, POLYURETHANES, POLYESTERS AND POLYALKYLENEIMINE REACTION PRODUCTS
Vittorio Cappuccio, Paolo Maltese, and Francesco Vacanti, Terni, Italy, assignors to Montecatini Edison S.p.A., Milan, Italy
No Drawing. Original application Dec. 12, 1957, Ser. No. 702,430, now Patent No. 3,107,228, dated Oct. 15, 1963. Divided and this application May 21, 1963, Ser. No. 282,134
Claims priority, application Italy, Dec. 12, 1956, 18,227/56; Nov. 19, 1957, 16,501/57
16 Claims. (Cl. 260—859)

This application is a division of application Ser. No. 702,430 filed Dec. 12, 1957, now Patent No. 3,107,228.

This invention relates to improved textile fibers comprising polyolefins. More particularly, it relates to textile fibers of at least prevailingly crystalline polymeric olefins having improved dyeing and other physical properties.

Recently G. Natta and his co-workers have disclosed new polymers of the alpha-olefins $CH_2=CHR$ wherein R is a hydrocarbon radical, which polymers are of two different steric structures termed, by G. Natta, "isotactic" and "atactic" respectively.

The isotactic polymers are normally solid, linear, regular head-to-tail polymers consisting essentially of macromolecules in which substantially all of the asymmetric tertiary main-chain carbon atoms of adjacent monomeric units have the same steric configuration and the main chain of the macromolecules, when fully extended in a plane, shows substantially all of the R groups on one side of the plane and all of the hydrogen atoms bound to the tertiary carbon atoms on the opposite side. Because of their orderly steric structure, the isotactic polymers are crystalline or crystallizable.

The atactic polymers are also normally solid, linear, regular head-to-tail polymers but have a different steric structure, being made up essentially of macromolecules in which tertiary asymmetric carbon atoms of the main chain having the same steric configuration have substantially a random distribution. When the main chain of the macromolecules of the atactic polymers is fully extended in a plane, it shows the R groups and the hydrogen atoms bound to the tertiary carbon atoms substantially in random distribution on the two sides of the plane. Due to their disorderly steric structure, the atactic polymers are amorphous and non-crystallizable.

As Natta et al. have shown, the isotactic and atactic polymers are, in general, obtained in admixture when the alpha-olefin is polymerized with the aid of certain catalysts prepared from compounds of transition metals of Groups IV to VI of the Periodic Table (according to Mendeleef) and organometallic compounds of Groups II-III of the table. When the mixtures are obtained, the polymers can be separated on the basis of their different steric structures by means of selective solvents.

Natta et al. have shown, further, that by using specific selected catalysts of the general type described hereinabove, the polymerization of the alpha-olefin can be oriented to the production of prevailingly to substantially completely isotactic polymers, or to the production of prevailingly to substantially completely atactic polymers.

The polymers which are at least prevailingly (over 60%) isotactic, and especially prevailingly isotactic polypropylene, can be formed into shaped articles, including fibers, yarns, films, etc. having exceptional mechanical properties.

However, the articles comprising the highly isotactic (crystalline) polymers do not have good receptivity for swelling agents, dyes, pigments, etc. Moreover, such articles have a very low moisture-absorbing capacity and since those polymers have high insulating power the articles comprising them tend to accumulate electrostatic charges on the surface thereof which complicates fabrication of the fibers and yarns on conventional textile-processing apparatus. These characteristics of the polymers somewhat hamper their practical utilization, particularly in the textile fiber field, in spite of their other very desirable properties such as high mechanical strength, elasticity, low density, etc.

It has been proposed by associates of the present inventors to improve the absorption capacity of shaped articles comprising the at least prevailingly isotactic polymers by grafting onto the surface thereof polymeric chains containing active groups or elements which facilitate the absorption of wetting agents, dyes, etc.

Such processes accomplish the objective, but generally require special precautions in carrying them out in practice to avoid reduction in the mechanical strength of the shaped articles treated.

It has been proposed to improve the dyeing and other characteristics of such polymeric materials as polyacrylonitrile and polyvinylchloride by mixing those polymers with other polymers or copolymers of various kinds.

Due to the special properties of the prevailingly isotactic poly (alpha-olefins) it did not appear that such methods would be satisfactory when applied to them.

However, as disclosed in the pending application Ser. No. 683,981, filed Sept. 16, 1957, now U.S. Pat. No. 3,013,998, it was found that an affinity for dyes can be imparted to the highly isotactic polymers by mixing the same with fusible epoxy resins, which were found to be compatible with the isotactic polymers and which appeared to be specific for that purpose.

Surprisingly, we find that, provided critical requirements as set forth herein are met, certain other polymeric materials having good absorption capacity for dyes, wetting agents, etc. are compatible with the isotactic polymers and can be mixed therewith, prior to shaping the polymers from solution or a melt, to obtain a mass which yields homogeneous shaped articles having the improved dyeing and other properties.

The polymeric modifying substance for use with the isotactic polymers must have the following critical characteristics:

(a) A molecular weight of at least 1,000;
(b) Solubility or emulsifiability in the prevailingly isotactic poly (alpha-olefin);
(c) A 2nd order transition temperature lower than the melting point of the poly (alpha-olefin);
(d) Insolubility in water or the capacity to be insolubilized during a spinning operation;
(e) An affinity for one or more classes of dyes.

The polymeric materials which we have found to have the requisite characteristics for use as modifier for the polymeric olefins and including the prevailingly isotactic poly (alpha-olefins), and which we have used advantageously for that purpose, include polyalkyleneimines in which the alkylene group contains from 2 to 20 carbon atoms, reaction products of the polyalkyleneimines with alcohols, acids, esters, amides, aldehydes, halogenated hydrocarbons, hydrohalogen acids, carbon disulfide, acrylonitrile, etc., copolymers of ethyleneimine, e.g., copolymers thereof with isocyanates, casein, and alkylene oxides, polyaminotriazoles, polyester resins obtained by the polycondensation of dicarboxylic acids and glycols, polyamides including polycondensates of diamines with dicarboxylic acids, polycondensates of cyclic amides such as ε-caprolactam, polyurethanes, polyureas, and in general polymeric materials containing the characteristic group —NH—CO—, and which satisfy the requirements set forth herein.

For instance, when prevailingly isotactic polypropylene is mixed with a small amount of a polyethyleneimine meeting the requirements listed above, (and which has, inherently, a strong affinity for the acid dyes) the mixture can be spun into fibers having good mechanical properties and good receptivity for the acid dyes. These fibers can be mixed with natural fibers or with artificial proteinaceous fibers which are normally inherently receptive to the acid dyes, such as wool, lanital, "Acrilan," "Orlon" and the like, to obtain blends which can be dyed uniformly with the acid dyes.

Tests carried out with mixtures of prevailingly isotactic polypropylene and nitrogenous polymeric modifiers of the classes indicated have given results similar to those obtained with the mixtures of the polypropylene and polyethyleneimine.

The prevailingly isotactic poly(alpha-olefins) are most difficulty dyed with the acid dyestuffs and, therefore, the possibility of readily dyeing the mixtures of those polymers with polyethyleneimine, derivatives thereof, and copolymers derived from ethyleneimine, with the acid dyes, etc., represents a very important aspect of this invention. However, the invention is not limited to use of the acid dyes and by selection of the specific type of polymeric modifying material mixed with the crystalline polymer, other types of dyes can be used successfully.

Thus, the polymeric polyethyleneimines and ethyleneimine copolymers increase the receptivity of the prevailingly crystalline polymeric olefins for dispersed acetate dyes. Very good results with the dispersed acetate dyes or other dyes have also been obtained on mixtures of the prevailingly crystalline polymeric olefins with other polymeric modifiers as disclosed herein and containing the —NH—CO— group.

The proportion of the polymeric modifier mixed with the prevailingly crystalline polymeric olefin can be varied and determined empirically depending on the particular polymeric modifier selected. In general, an amount of the polymeric modifier between 0.1% and 20% is sufficient.

It is advantageous, in some instances, to use mixtures of varying amounts of two or more of the polymeric modifiers, for example mixtures of two or more polymeric materials selected from polyamides and polyalkyleneimines.

The presence of these polymeric modifiers in the mixture with the isotactic poly(alpha-olefin) in amounts sufficient to modify the dye and moisture absorption capacity thereof does not influence the later operations of shaping the mixture to obtain fibers and then stretching and stabilizing the fibers and yarns. These operations are carried out in the same way, and under the same conditions, as are used in connection with a melt or solution of the isotactic polymer per se.

The fibers produced from the mixtures of the invention have mechanical properties which are substantially the same as those obtained from the prevailingly crystalline polymeric olefins per se but have improved dyeability, a much higher moisture absorption capacity, greater resistance to the accumulation of electrostatic charges and, surprisingly, in many cases exhibit a remarkable increase in stability to ultra-violet and natural light.

While the invention has been discussed in terms of textile fibers, the present mixtures are also useful for the preparation of other shaped articles such as films, tapes, and in general articles of any shape and size which it is desired to dye to colors which are fast to wear, solvents, washing, light, etc., and which are antistatic, resistant to light, and have good moisture absorbing properties.

The following examples are given to illustrate specific embodiments of the invention, it being understood that these examples are not intended as limiting.

*Example 1*

About 90 parts by weight of polypropylene having an intrinsic viscosity of 1.13 and 10 parts of a polyamide obtained by heating ε-amino-caproic acid to 210–220° C. (melting point 203° C., Fikentscher's value determined in 0.5% m-cresol solution, $K=74.4$, 2nd order transition temperature 50–55° C.) are mixed together. The spinning is carried out by melting the mixture at 265° C. and extruding it through a spineret with 18 holes having a diameter of 0.4 mm. The yarn is stretched with a ratio of 1:4.5.

The yarn has the following characteristics:

Tenacity _____ 2.39 g./den.
Elongation _____ 36.4%
Shrinkage at 100°
  C. in water _____ 10%
Resistivity _____ $7.66 \times 10^5$ ohm×cm.
Dyeability _____ Good with acid dyes and acetate dyes.
Color fastness _____ Generally good.
Moisture regain[1] ___ 0.56% at 50% relatively humidity;
  1.55% at 80% relative humidity;
  7.25% at 100% relative humidity.

[1] Determined by exposure of the samples for 70 hours in rooms with 50, 80 and 100% of relatively humidity.

*Example 2*

90 parts by weight of polypropylene having an intrinsic viscosity of 1.29 are mixed with 10 parts of a polyamide obtained from hexamethylenediamine and sebacic acid (melting point 209° C.; Fikentscher's value, determined in a 0.5% m-cresol solution, $K=53$). Spinning is carried out by melting this mixture at 250° C. and extruding it through a spinneret with 18 holes having a diameter of 0.4 mm. The yarn is stretched with a ratio of 1:4.5.

The yarn has the following characteristics:

Tenacity _____ 4.28 g./den.
Elongation _____ 36.8%.
Shrinking at 100° C. in water___ 5.93%.
Resistivity _____ $11.3 \times 10^4$ ohm×cm.
Dyeability _____ Good with acid dyes and acetate dyes.
Color fastness _____ Generally good.
Moisture regain _____ 6.4% with 50% relative humidity; 11.9% with 80% relative humidity; 35.0% with 100% relative humidity.

Another spinning run was carried out using a mixture of 90 parts polypropylene having an intrinsic viscosity of 1.29 and 10 parts of a similar polyamide having a K value of 26.6. The results both of spinning and dyeability of the fibers and films are almost identical with those of the preceding run.

*Example 3*

90 parts by weight of polypropylene having an intrinsic viscosity of 1.13 are mixed with 10 parts of a polyurethane obtained by condensation of butylene glycol with toluene-diisocyanate, and having a 2nd order transition temperature of 14–18° C.

Spinning is carried out by melting the mixture at 250° C. and extruding it through a spinneret with 18 holes having a diameter of 0.4 mm. The yarn is stretched with a ratio of 1:4.5. The stretched fibers appear dyeable with acid dyes and acetate dyes.

*Example 4*

90 parts by weight of polypropylene with an intrinsic viscosity of 1.13 are mixed with 10 parts of a polyurea obtained by condensation of hexamethylenediamine and toluene-diisocyanate (Fikentscher K value 22.6, determined in a 0.5% m-cresol solution).

The spinning is carried out by melting this mixture at 250° C. and extruding it through a spinneret with 18 holes having a diameter of 0.4 mm. The yarn is stretched with a ratio of 1:4.5. The stretched fibers can be dyed with acid dyes and acetate dyes.

Example 5

A mixture of crystalline polypropylene having an intrinsic viscosity of 1.17 with a resin obtained by condensation of pentamethylenediamine with malonic acid, having a melting point of 191° C., is prepared. Mixing is carried out in a Werner type mixer at room temperature adding 15 parts polyamide resin to 85 parts polypropylene. The mass is melted at 250° C. and extruded through a spinneret with 18 holes having a diameter of 0.2 mm. The yarn obtained, stretched with a ratio of 1:5, has the following characteristics:

Tenacity, g./den. _____ 5.7
Elongation, percent _____ 22

A 10 g. sample was immersed in a dye bath containing the blue Navy Vialon fast dye (4% by weight of the fibers and 1 cc./liter of a dispersing agent). Dyeing was continued for 1 hour at 100° C. and after 30 minutes 1 g. per liter of ammonium sulfate was added. The fibers were then washed at 60° C. in a bath containing 1 g. per liter of the dispersing agent.

The fibers are colored a deep blue with a good fastness to light, rubbing and washing.

Example 6

970 g. crystalline polypropylene having an intrinsic viscosity of 1.13 are mixed with 30 g. of a polyethyleneimine having a relatively low molecular weight but above 1000 and a melting point of 25–30° C., obtained by polymerization of ethyleneimine with hydrochloric acid at 80° C. for 5 hours. The mixture is melted at 240° C. and extruded through a spinneret with 18 holes (diameter 0.4 mm.); the yarn obtained, stretched with a ratio of 1:4.5 has the following characteristics.

Tenacity_____ 4 g./den.
Elongation_____ 30%.
Moisture regain_____ 1.2% with 50% relative humidity; 3% with 80% relative humidity; 7% with 100% relative humidity.
Resistivity_____ $3.6 \times 10^6$ ohm×cm.

The dyeability of these fibers is very good with acid dyes. Yarns obtained from blends of the same fibers with wool are dyed with the following dyes, obtaining uniform colors: Novamine 2 GP Yellow, Red amidonaphthol A 2B, Fast light Green 2G, Alizarine Grey 2 BL.

Dyeing is carried out according to the usual methods, with 3% by weight of the dye based on the blend, in the presence of acetic acid.

Example 7

80 g. polyethyleneimine are dissolved in 200 cc. ethyl alcohol and 20 g. stearyl chloride are added. The mixture is refluxed for 4 hours. The solvent is eliminated by distillation under vacuum. A waxy resin with a softening point of 25–40° C. is separated which is then mixed with 900 g. polypropylene having an intrinsic viscosity of 0.96. This mixture, after homogenization in a mill, is spun at 210° C. through a spinneret with 18 holes (0.4 mm. diameter).

The characteristics of the yarn, after stretching with a ratio of 1:4.5 are as follows:

Tenacity_____ 2.05 g./den.
Elongation_____ 22%.
Resistivity_____ $1.66 \times 10^5$ ohm×cm.
Moisture regain_____ 1.7% with 50% relative humidity; 5.3% with 80% relative humidity; 42.2% with 100% relative humidity.

The fiber has a very good dyeability with the following dyes: Wool Red B, Alizarine Blue SE, Brilliant Acid Green 2G.

Example 8

To 80 g. polyethyleneimine 20 g. chlorinated paraffinic wax are added and the mixture is heated to 120° C. for 2 hours. The yellowish resin obtained is mixed with 900 g. polypropylene having an intrinsic viscosity of 0.97. This mixture is then spun at 250° C. The filaments obtained are stretched with a ratio of 1:4.5. They have the following characteristics:

Tenacity_____ 3.65 g./den.
Elongation_____ 28%.
Resistivity_____ $4.65 \times 10^5$ ohm×cm.
Moisture regain_____ 0.9% with 50% relative humidity; 10.2% with 80% relative humidity; 13.3% with 100% relative humidity.

They also have good dyeability with the following dyes: Alizarine Blue ACF, Wool Red B, Fast Light Yellow 2G.

Example 9

40 g. ditoluendiisocyanate are added to 80 g. polyethyleneimine. This mass is heated to 60° C. for 6 hours. A waxy resin with a softening point of 25–40° C. is obtained which is mixed with 900 g. polypropylene having an intrinsic viscosity of 0.97. The mixture is spun at 250° C. The yarns can be satisfactorily dyed with the following acid dyes; Fast light Yellow 2G, Wool Red B, Alizarine Blue ACP, and they present the following characteristics:

Tenacity_____ 3.2 g./den.
Elongation_____ 30%.
Resistivity_____ $1 \times 10^{12}$ ohm×cm.
Moisture regain_____ 0.69% with 50% relative humidity; 0.8% with 80% relative humidity; 3.9% with 100% relative humidity.

Example 10

20 g. acetic anhydride are added to 80 g. polyethyleneimine dissolved in alcohol. The mass is refluxed for 3 hours, the solvent is then distilled off under vacuum and a waxy yellowish resin having a softening point of 35–45° C. is obtained. This resin is mixed with 900 g. polypropylene having an intrinsic viscosity of 0.97. The mixture obtained is spun at 250° C. The yarns can be satisfactorily dyed with the following dyes; Fast light Yellow 2G, Wool Red B, Alizarine Blue ACF, and present the following characteristics:

Tenacity_____ 2.62 g./den.
Elongation_____ 19%.
Resistivity_____ $2.13 \times 10^6$ ohm×cm.
Moisture regain_____ 1.5% with 50% relative humidity; 3.1% with 80% relative humidity; 12.3% with 100% relative humidity.

Example 11

900 g. crystalline polypropylene having an intrinsic viscosity of 1.07 are mixed with 100 g. of a polyester resin, obtained by condensation of sebacic acid and propylene glycol, having a 2nd order transition temperature of between −50° C. and −45° C., a molecular weight of 3,300–4,000 (determined by the cryoscopic method in acetic acid) and a softening point of 5–10° C. The mixture is melted at 250° and extruded through an 18 hole spinneret (0.4 mm. diameter).

The yarn obtained after stretching has very good dyeability with the acetate dyes.

As will be apparent from the examples given, other crystalline polymers besides the prevailingly isotactic poly(alpha-olefins) can be modified advantageously in accordance with the invention and particularly linear, highly crystalline polyethylene.

So long as the modifying polymer or copolymer has a molecular weight of at least 1000, the upper limit on the molecular weight is not critical, provided the polymer is compatible with the polymeric olefin in the amounts used and has the other characteristics which we have determined are required for successfully modifying the dyeing and absorption properties of the shaped articles of the crystalline polymeric olefins without any appreciable damage to the other inherent desirable properties of the articles such as the mechanical strength.

Since various changes and modifications may be made in details in practicing the invention, without departing from the spirit thereof, we intend to include in the scope of the appended claims all such changes and variations as may be apparent to those skilled in the art.

What is claimed is:
1. A readily dyeable composition adapted to be formed into shaped articles having increased receptivity for dyes, said composition consisting essentially of (1) polypropylene made up prevailingly of isotactic macromolecules and (2) from 0.1% to 20% by weight based on the total weight of the composition of a water-insoluble, polymeric, dye-receptive modifier dispersible in the polypropylene when the latter is melted, said modifier having a molecular weight of at least 1,000, and 2nd order transition temperature below the melting point of the polypropylene, and being selected from the group consisting of polyamides which are polycondensates of cyclic amides, and polyamides which are polycondensates of aliphatic diamines with dicarboxylic acids, polyurethanes, polyureas, polyesters which are polycondensates of alkylene glycols with dicarboxylic acids, reaction products of polyalkyleneimines containing from 2 to 20 carbon atoms with a substance selected from the group consisting of chlorinated paraffin waxes, diisocyanates, lower aliphatic acid anhydrides, hydrohalogen acids and monobasic fatty acid chlorides.
2. The readily dyeable composition of claim 1 wherein the polymeric, dye-receptive modifier is a polyamide.
3. The readily dyeable composition of claim 1 wherein the polymeric, dye-receptive modifier is a polyurethane.
4. The readily dyeable composition of claim 1 wherein the polymeric, dye-receptive modifier is a polyurea.
5. The readily dyeable composition of claim 1 wherein the polymeric, dye-receptive modifier is a polyester.
6. The readily dyeable composition of claim 1 wherein the polymeric, dye-receptive modifier is a reaction product of a polyalkylene-imine containing from 2 to 20 carbon atoms with a substance selected from the group consisting of chlorinated paraffin waxes, diisocyanates, lower aliphatic acid anhydrides, hydrohalogen acids and monobasic fatty acids chlorides.
7. The readily dyeable composition of claim 1 wherein the polymeric, dye-receptive modifier is a polyamide obtained by heating ε-aminocaproic acid to 210–220° C.
8. The readily dyeable composition of claim 1 wherein the polymeric, dye-receptive modifier is a polyamide which is a condensation product of hexamethylenediamine and sebacic acid.
9. The readily dyeable composition of claim 1 wherein the polymeric, dye-receptive modifier is a polyurethane which is the condensation product of butylene glycol and toluene-diisocyanate.
10. The readily dyeable composition of claim 1 wherein the polymeric, dye-receptive modifier is a polyurea which is the condensation product of hexamethylenediamine and toluenediioscyanate.
11. The readily dyeable composition of claim 1 wherein the polymeric, dye-receptive modifier is a polyamide which is a condensation product of pentamethylenediamine and malonic acid.
12. The readily dyeable composition of claim 1 wherein the polymeric, dye-receptive modifier is a resin obtained by heating a mixture of polyethyleneimine with chlorinated paraffin wax.
13. The readily dyeable composition of claim 1 wherein the polymeric, dye-receptive modifier is a polyester which is a condensation product of sebacic acid and propylene glycol.
14. The readily dyeable composition of claim 1 wherein the polymeric dye-receptive modifier is a waxy resin obtained by heating a solution of polyethyleneimine in ethyl alcohol with stearyl chloride.
15. The readily dyeable composition of claim 1 wherein the polymeric, dye-receptive modifier is a waxy resin obtained by heating polyethyleneimine with ditoluenediisocyanate.
16. The readily dyeable composition of claim 1 wherein the polymeric, dye-receptive modifier is a waxy resin obtained by heating a solution of polyethyleneimine in alcohol with acetic anhydride.

References Cited by the Examiner
UNITED STATES PATENTS

| | | | |
|---|---|---|---|
| 2,696,478 | 12/1954 | Craig | 260—873 |
| 2,744,086 | 5/1956 | Mowry et al. | 260—873 |
| 3,013,998 | 12/1961 | Battaglioli | 8—55 |

MURRAY TILLMAN, *Primary Examiner.*

E. J. TROJNAR, P. LIEBERMAN, *Assistant Examiners.*